Feb. 6, 1934.  C. STANSBURY  1,945,830
MOTOR CONTROLLER
Filed Feb. 12, 1931
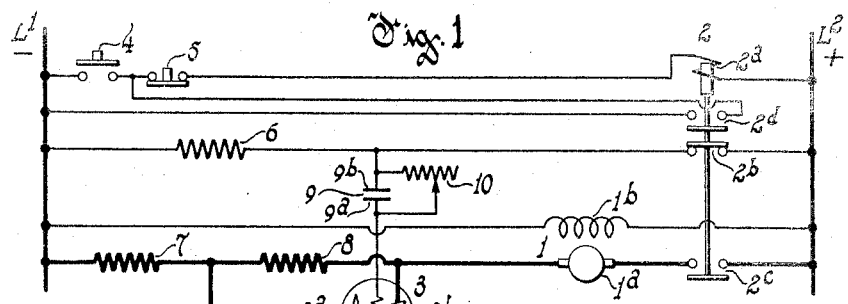
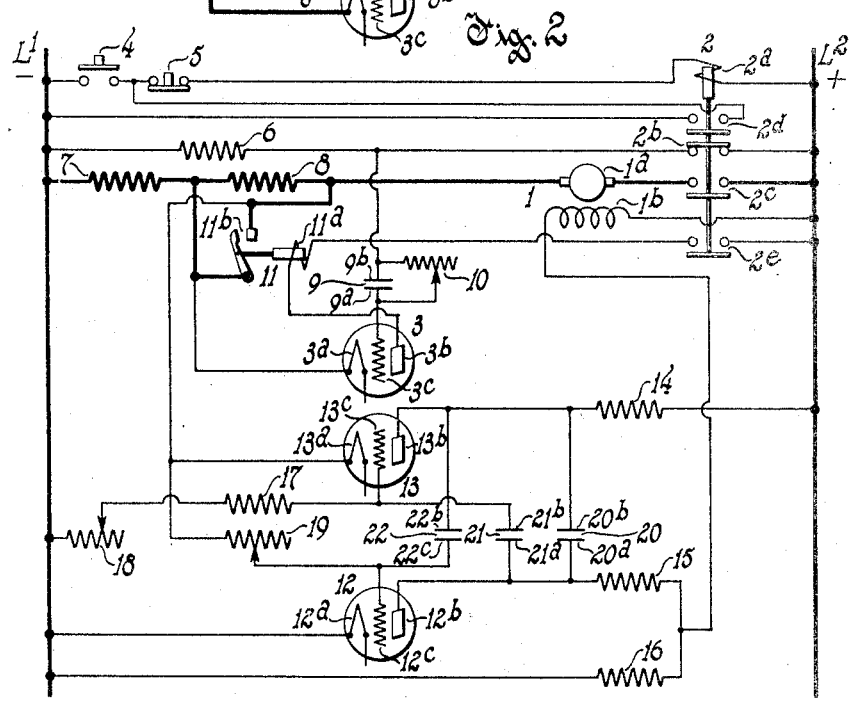
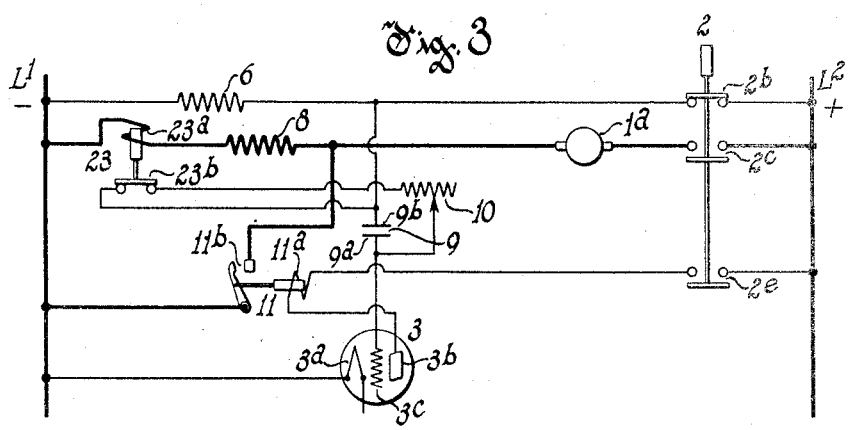
Inventor
Carroll Stansbury
By Franko Hubbard
Attorney Patented Feb. 6, 1934

1,945,830

UNITED STATES PATENT OFFICE 1,945,830

MOTOR CONTROLLER

Carroll Stansbury, Wauwatosa, Wis., assignor to Cutler-Hammer, Inc., Milwaukee, Wis., a corporation of Delaware Application February 12, 1931. Serial No. 515,193

8 Claims. (Cl. 172—288)

This invention relates to the control of the acceleration and operating speed of motors by means of electron tubes.

An object of the invention is to provide for controlling the acceleration of a motor at a given rate.

Another object is to control the acceleration of a motor as a function of the accelerating current and time.

Other objects and advantages of the invention will hereinafter appear.

In the accompanying drawing, Figure 1 is an elementary diagram illustrating the use of the invention for commutating the accelerating resistance of a motor at a given rate modified by an influence of the accelerating current.

Figs. 2 and 3 show modifications of the system illustrated in Fig. 1.

Referring to Fig. 1, $L^1$ and $L^2$ are respectively the negative and positive terminals of a direct current supply circuit, which supplies current to a motor 1 having an armature $1^a$ and a field winding $1^b$. The field winding $1^b$ is connected across the lines $L^1$—$L^2$. A magnetic switch 2, having a winding $2^a$, normally closed contacts $2^b$ and normally open contacts $2^c$ and $2^d$, respectively, is provided for commutating various circuits which will be explained later. A gaseous thermionic tube 3, having a heated cathode $3^a$, an anode $3^b$ and a grid $3^c$ serves to control the motor accelerating resistance. A normally open push button switch 4 provides for starting of the equipment, while a normally closed push button switch 5 provides for stopping thereof. The push button switches 4 and 5 are connected in series with the winding $2^a$ across the lines $L^1$ and $L^2$, switch 4 being paralleled by the contacts $2^d$. An impedance 6 is connected across the lines $L^1$ and $L^2$, the connection to the line $L^2$ being controlled by the contacts $2^b$. The armature $1^a$ of the motor is in series with an impedance 7, the purpose of which is to be explained below, and with an accelerating impedance 8. The armature circuit is controlled by the contact $2^c$. The cathode $3^a$ is connected to the junction point of the impedances 7 and 8 and the anode $3^b$ to the junction between the impedance 8 and the armature $1^a$, so that when the tube becomes conducting it shunts the impedance 8. A condenser 9, having plates of opposite polarity $9^a$ and $9^b$ connects the grid $3^c$ with the resistance 6 and is shunted by an adjustable impedance 10, which is preferably non-inductive.

The system illustrated in Fig. 1 operates as follows:

When the lines $L^1$ and $L^2$ are energized the shunt field $1^b$ is excited. Closure of switch 4 causes current to flow from line $L^2$, through winding $2^a$, switches 5 and 4 to line $L^1$. The magnet switch 2 is thereby energized and attracts its armature and opens contacts $2^b$ and closes contacts $2^c$ and $2^d$. Closure of contacts $2^d$ short circuits switch 4, so that push button 4 may be released without deenergizing switch 2. Closure of contacts $2^c$ completes the armature circuit from line $L^2$, through contacts $2^c$, the armature and the impedances 8 and 7 to line $L^1$. The armature is thereupon accelerated. Opening of contacts $2^b$ opens the circuit from line $L^2$ to line $L^1$ through resistance 6. Prior to the opening of contacts $2^b$ the grid $3^c$ of tube 3 had a potential positive with respect to the cathode. Upon opening of contacts $2^b$, which takes place before closure of contacts $2^c$, condenser plate $9^b$ becomes negative, resulting in a corresponding drop of the potential of plate $9^a$ to a value which makes the grid $3^c$ negative with respect to line $L^1$. Completion of the motor circuit impresses substantially the potential of line $L^2$ upon anode $3^b$, while cathode $3^a$ has a potential which is equal to that of line $L^1$, plus the potential drop through the impedance 7. The grid $3^c$ therefore becomes still more negative with respect to the cathode $3^a$. Closure of contact $2^c$ impresses a high potential between cathode and anode, but no current can flow between them on account of the negative grid potential. This negative grid potential gradually is reduced by discharge through impedance 10 until it is low enough to permit current flow through the tube. The latter current in effect reduces the impedance of the armature circuit and thus causes further acceleration of the motor.

It is obviously possible to employ a number of starting steps, each with an impedance and a corresponding tube and adjust the system so that the various steps operate in succession.

It is apparent that the potential of the cathode $3^a$ and thus the potential of the grid with respect to the cathode vary with the voltage drop through the impedance 7. The moment at which the grid attains the proper potential with respect to the cathode to permit current flow through the tube is thus affected by the accelerating current of the motor, so that the accelerating impedance is varied in accordance with the time function of the condenser discharge circuit, modified by the accelerating conditions of the motor.

Referring now to Fig. 2 it will be seen that it is a modification of Fig. 1. A magnet switch 11 having a magnet winding $11^a$ and normally open contacts $11^b$ when energized short-circuits the accelerating impedance 8. One terminal of the winding $11^a$ is connected to the anode $3^b$, while the other terminal is connected through the contacts $2^e$ to the line $L^2$.

For controlling the field circuit of the motor I provide a controller similar to that described in my copending application Serial No. 431,993, but any other type may be employed. Two thermionic tubes 12 and 13 have the respective cathodes 12$^a$ and 13$^a$, anodes 12$^b$ and 13$^b$ and grids 12$^c$ and 13$^c$. A resistance 14 is connected between the anode 13$^b$ and the line L$^2$, while resistances 15 and 16 are connected in series between the anode 12$^b$ and the line L$^1$. The cathode 13$^a$ is connected to a point in the armature circuit, while the cathode 12$^a$ is connected to the line L$^1$. Resistances 15 and 16 shunt the tube 12. The field winding 1$^b$ is connected between a point intermediate of the resistances 15 and 16 and the line L$^2$. A resistance 17 has one terminal connected to the grid 13$^c$ while its other terminal is connected to the movable contact of the resistance 18, one terminal of the latter being connected to the line L$^1$. An adjustable resistance 19 is connected between the grid 12$^c$ and the cathode 13$^a$. A condenser 20 has one plate connected to the anode 12$^b$ while the other plate is connected to the anode 13$^b$. The condenser 21 has one plate 21$^a$ connected to the anode 12$^b$, while its other plate 21$^b$ is connected to the grid 13$^c$. A condenser 22 has its plate 22$^a$ connected to the grid 12$^c$, while its other plate 22$^b$ is connected to the anode 13$^b$.

Operation of the system is as follows:

If the lines L$^1$ and L$^2$ are energized and the push button 4 is depressed, current flows from line L$^2$ through magnet winding 2$^a$, normally closed push button 5 and normally open push button 4 to line L$^1$. The magnet switch 2$^a$ is thereby energized and it attracts its armature and opens the normally closed contacts 2$^b$ and closes the normally open contacts 2$^c$, 2$^d$ and 2$^e$. The closure of contacts 2$^d$ short-circuits switch 4 so that when the push button is released the magnet switch 2 will stay closed. Closure of contacts 2$^c$ completes the armature circuit of the motor, from line L$^2$ through contacts 2$^c$, the armature 1$^a$, starting resistance 8 and impedance 7 to line L$^1$. The motor field 1$^b$ is already excited, as will be explained later. The motor armature is thereupon accelerated. The opening of contacts 2$^b$ opens the circuit from line L$^2$ to line L$^1$ through the resistance 6. Prior to the opening of contacts 2$^b$ the grid 3$^c$ of tube 3 had a potential slightly positive with respect to its cathode 3$^a$. Upon opening of contacts 2$^b$, condenser plate 9$^b$ becomes negative, which causes a corresponding drop of potential of plate 9$^a$, so that the potential of grid 3$^c$ is reduced below that of line L$^1$. Simultaneously with the opening of the contacts 2$^b$ the contacts 2$^e$ are closed, thus connecting the anode 3$^b$ to the line L$^2$ and impressing thereon substantially the potential of the latter, while the cathode 3$^a$ has a potential which is equal to that of line L$^1$ plus that of the potential drop through the impedance 7. The grid 3$^c$ therefore becomes still more negative with respect to the cathode 3$^a$. The closure of contacts 2$^e$ impresses substantially line potential between the cathode 3$^a$ and the anode 3$^b$, but no current can flow as the grid 3$^c$ is negative. The negative potential of the grid 3$^c$ gradually leaks off through the resistance 10 until the grid has attained a potential which will permit current flow between the main electrodes of the tube. This energizes the winding 11$^a$ of switch 11 and causes closure of the contact 11$^b$, thereby short-circuiting the starting resistance 8 and further accelerating the motor.

When the motor armature has accelerated the armature current decreases to a normal value, thus reducing the voltage drop through the impedance 7. The grid 13$^c$ of tube 13 has originally the potential of the line L$^1$ while the potential of the cathode 13$^a$ is positive with respect to said grid by an amount which is determined by the voltage drop of the armature current through the impedances 7 and 8. The short-circuiting of the impedance 8 and the decrease of the armature current and resultant decrease of the voltage drop in impedance 7 decrease the negative potential of the grid 13$^c$ with respect to the cathode 13$^a$ so that the former is not any more capable to prevent the flow of current through tube 13. The current then flows from line L$^2$ through the impedance 14, tube 13, contacts 11$^b$ and impedance 7 to line L$^1$. The potential of the condenser plates 20$^b$ and 22$^b$ was approximately that of the positive line L$^2$ before the tube 13 conducted. Due to the flow of current this positive potential is reduced to a low value with the result that the potentials of the opposite plate of the respective condensers drops correspondingly. This makes the anode 12$^b$ of tube 12 negative with respect to the cathode 12$^a$ and current flow through the tube 12 and impedance 15 is stopped so that the current passing through the motor field 1$^b$ is limited by the relatively high resistance 16 and its field strength is diminished accordingly. The tube 12 cannot restart immediately even after the condenser 20 is discharged as the grid 12$^c$ is negative. This negative charge gradually leaks off from the grid and the condenser plate 22$^a$ through the resistance 19, tube 13, back to condenser plate 22$^b$. As soon as the potential of the grid 12$^c$ has again reached a relatively low value, current flow through the tube 12 and the resistance 15 is re-established so that the motor field 1$^b$ again receives a relatively high current.

Starting of the current through the tube 12 reduces the high positive potential on the condenser plates 20$^a$ and 21$^a$ so that the potential of the opposite plates attains a corresponding negative value. This causes the anode 13$^b$ of tube 13 to become negative with respect to the cathode 13$^a$ and current flow through said tube and the resistance 14 is stopped and is prevented from re-starting until the negative potential of the grid 13$^c$ has been reduced by discharge current flow over a path from the grid and the plate 21$^b$, through the resistance 17, adjustable resistance 18 and through the tube 12, back to plate 21$^a$. Hence when the grid 13$^c$ has again attained its normal potential, the tube 13 becomes again conducting and the cycle described above is repeated. By adjusting the resistances 18 and 19, it is possible to adjust the cycle of operation of the tubes 12 and 13, thereby adjusting the effective current of the field 1$^b$. It is thus possible to control the field strength and with it the speed of the motor. It will also be apparent that the system insures that the motor always starts with maximum field strength and the field regulating means only becomes effective after the motor has attained approximately its normal speed and the accelerating current has been reduced to approximately its normal value. If the motor current varies, the voltage drop through the impedance 7 varies, thus causing a corresponding variation of the bias of the grids 12$^c$ and 13$^c$, thereby varying the relative time during which the tubes 12 and 13 are conducting.

It will further be apparent that any variation of the armature current produces a corresponding variation of the grid bias of the tubes 12 and 13, thus varying the timing of said tubes and the resulting average field current in accordance with such armature current variation. Hence any rapid variation of the motor operating conditions, which tends to produce a corresponding transient change of armature current, affects the timing of the tubes 12 and 13 and thereby reduces the magnitude of such transient currents.

Fig. 3 is a modification of Fig. 2 wherein the removal of the accelerating resistance in the armature circuit is made subject to control by the armature current through a current responsive relay. A current responsive relay 23, having a magnet winding 23ª and normally closed contacts 23ᵇ, has its winding connected in series with the accelerating impedance 8 and its contacts are connected in series with the adjustable discharge impedance 10.

The system illustrated in Fig. 3 operates in the following manner: After the motor has been connected to the circuit in the manner aforedescribed, the armature current maintains the switch 23 in its attracted position, thereby preventing discharge of the negative potential on the condenser plate 9ᵇ and grid 3ᶜ. After the motor has accelerated sufficiently and the accelerating current has reached a low value, the switch 23 permits closure of contacts 23ᵇ, thereby completing the discharge circuit around condenser 9 and permitting the grid 3ᶜ to gradually attain a potential which permits the flow of current through the tube 3 and magnet winding 11ª, whereupon switch contacts 11ᵇ short-circuit the impedance 8 in the manner aforedescribed in connection with Fig. 2. It will thus be seen that the accelerating impedance 8 is cut out of circuit only after a certain time has elapsed from the moment when the accelerating current has dropped to a desired minimum.

Relay 23 is cut out of circuit upon closure of switch 11, so that it has no further effect upon the control of the motor field.

If it is desired to stop the motor in the system shown in Figs. 1, 2 or 3 push button 5 is depressed, which causes deenergization of the switch 2 and opening of the armature circuit.

Other modifications coming within the scope of the description and claims will be readily apparent to one skilled in the art.

What I claim as new and desire to secure by Letters Patent is:

1. In combination, a power supply, a motor, accelerating means for the motor, said means affording armature circuit commutation and including a gaseous electron tube having a grid, means to subject said grid to a transient potential under the influence of which said tube will be non-conducting for a given time interval and thereafter will afford full current flow instantly, and means for subjecting said grid to a further influence which is a function of the accelerating current.

2. In combination, a power supply, a motor, accelerating means for the motor armature circuit including a gaseous electron tube having a grid, means to subject said grid to a transient potential under the influence of which said tube will be non-conducting for a given time interval and thereafter will afford full current flow instantly, and means for subjecting said grid to a further influence which is a function of the accelerating current.

3. In combination, a power supply, a motor, accelerating means for the motor, said means affording armature circuit commutation and including a gaseous electron tube having a grid, an energy storage circuit, and means to charge and discharge said storage circuit and subject said grid to the transient potential resulting from said discharge to thereby delay current flow through said tube for a given time interval.

4. In combination, a power supply, a motor connected to said supply and having an armature, accelerating resistance for said armature, means for commutating said resistance including a gaseous electron tube having a grid, an energy storage circuit, and means to charge and discharge said storage circuit and subject said grid to the resultant transient discharge potential to thereby delay current flow through said tube for a given time interval.

5. In combination, a power supply, a motor connected to said supply and having an armature, accelerating resistance for said armature, means for commutating said resistance including a gaseous electron tube having a grid, an energy storage circuit, means to charge and discharge said storage circuit and subject said grid to a transient potential resulting from said discharge, to thereby delay current flow through said tube for a given time interval, and means for subjecting said grid to a further influence which is a function of the accelerating current and which affects the grid coincidently with the effect of the transient potential.

6. In combination, a power supply, a motor connected to said supply and having an armature, accelerating resistance for said armature, means for commutating said resistance including a gaseous electron tube having a grid, an energy storage circuit, means to charge and discharge said storage circuit and subject said grid to a transient potential resulting from said discharge, to thereby delay current flow through said tube for a given time interval, and means connected to respond to the accelerating current of the motor and subjecting the discharge of said storage circuit to a delay which is a function of such current.

7. In combination, a power supply, a motor connected to said supply and having an armature and field winding, accelerating resistance for said armature, means for commutating said resistance including a gaseous electron tube having a grid, an energy storage circuit, means to charge and discharge said storage circuit and subject said grid to a transient potential resulting from said discharge, to thereby delay current flow through said tube for a given time interval, field regulating means, and means subjecting said grid and said field regulating means to an influence which is a function of the accelerating current, the influence upon said grid being coincident with the effect of said transient potential.

8. In combination, a power supply, a motor connected to said supply and having an armature and a field winding, accelerating resistance for said armature, means for commutating said resistance including a gaseous electron tube having a grid, an energy storage circuit, means to charge and discharge said storage circuit and subject said grid to a transient potential resulting from said discharge, to thereby delay current flow through said tube for a given time interval, field regulating means, and means responsive to the accelerating current of the motor for subjecting the discharge of said storage circuit and said field regulating means to an influence which is a function of such current.

CARROLL STANSBURY.